(12) United States Patent
Braun-Huon

(10) Patent No.: US 7,590,637 B2
(45) Date of Patent: Sep. 15, 2009

(54) INTERACTIVE SYSTEM FOR PROCESSING AND RETRIEVING DATA RELATING TO A PARTICULAR DESTINATION VIA A COMMUNICATION DEVICE

(76) Inventor: Starr Braun-Huon, 15 Rue de la Gaite, Le Perreux (FR) 94170

( * ) Notice: Subject to any disclaimer, the term of this patent is extended or adjusted under 35 U.S.C. 154(b) by 764 days.

(21) Appl. No.: 10/258,753

(22) PCT Filed: May 11, 2001

(86) PCT No.: PCT/US01/15251

§ 371 (c)(1),
(2), (4) Date: Oct. 29, 2002

(87) PCT Pub. No.: WO01/88742

PCT Pub. Date: Nov. 22, 2001

(65) Prior Publication Data

US 2004/0133339 A1 Jul. 8, 2004

Related U.S. Application Data

(60) Provisional application No. 60/203,836, filed on May 12, 2000.

(51) Int. Cl.
*G06F 17/00* (2006.01)
(52) U.S. Cl. ..................................... 707/100
(58) Field of Classification Search .................. 726/20, 726/17; 707/100; 340/995, 444
See application file for complete search history.

(56) References Cited

U.S. PATENT DOCUMENTS

| | | | | |
|---|---|---|---|---|
| 5,948,040 A | * | 9/1999 | DeLorme et al. | ............ 701/201 |
| 6,091,956 A | * | 7/2000 | Hollenberg | ............... 455/456.5 |
| 6,202,023 B1 | * | 3/2001 | Hancock et al. | ............. 701/201 |
| 6,308,177 B1 | * | 10/2001 | Israni et al. | .................. 707/100 |
| 6,370,539 B1 | * | 4/2002 | Ashby et al. | ................. 707/102 |
| 6,580,904 B2 | * | 6/2003 | Cox et al. | ................. 455/456.2 |
| 6,640,098 B1 | * | 10/2003 | Roundtree | ............... 455/414.2 |
| 6,725,022 B1 | * | 4/2004 | Clayton et al. | ............ 455/154.1 |
| 6,728,531 B1 | * | 4/2004 | Lee et al. | ..................... 455/419 |
| 6,754,581 B1 | * | 6/2004 | Blachowicz et al. | ......... 701/202 |
| 6,829,475 B1 | * | 12/2004 | Lee et al. | ..................... 455/419 |
| 6,895,444 B1 | * | 5/2005 | Weisshaar et al. | ............ 709/250 |

* cited by examiner

*Primary Examiner*—Matthew B Smithers

(57) ABSTRACT

The present invention is directed to, in part, an efficient system and method for providing precise information to a user in response to a user input, as well as facilitating contact with merchants and other third parties. More specifically, a method is disclosed for providing data relating to a geographic location in a particular destination in response to a user input. The method comprises providing a map including the geographic location, receiving an identifier combination comprising a location identifier and a need identifier (609), accessing the data relating to the geographic location in a remote database based on the identifier combination (610), and transmitting the data to a user via a communication device. A method is also disclosed for providing data relating to one or more categories of information specific to a particular destination in response to a user input comprising providing a map including the particular destination, receiving an identifier combination comprising a need identifier and a sub-need identifier, accessing the data relating to the particular destination in a remote database, based on the identifier combination (646), and transmitting the data relating to the particular destination to a user via a communication device.

89 Claims, 13 Drawing Sheets

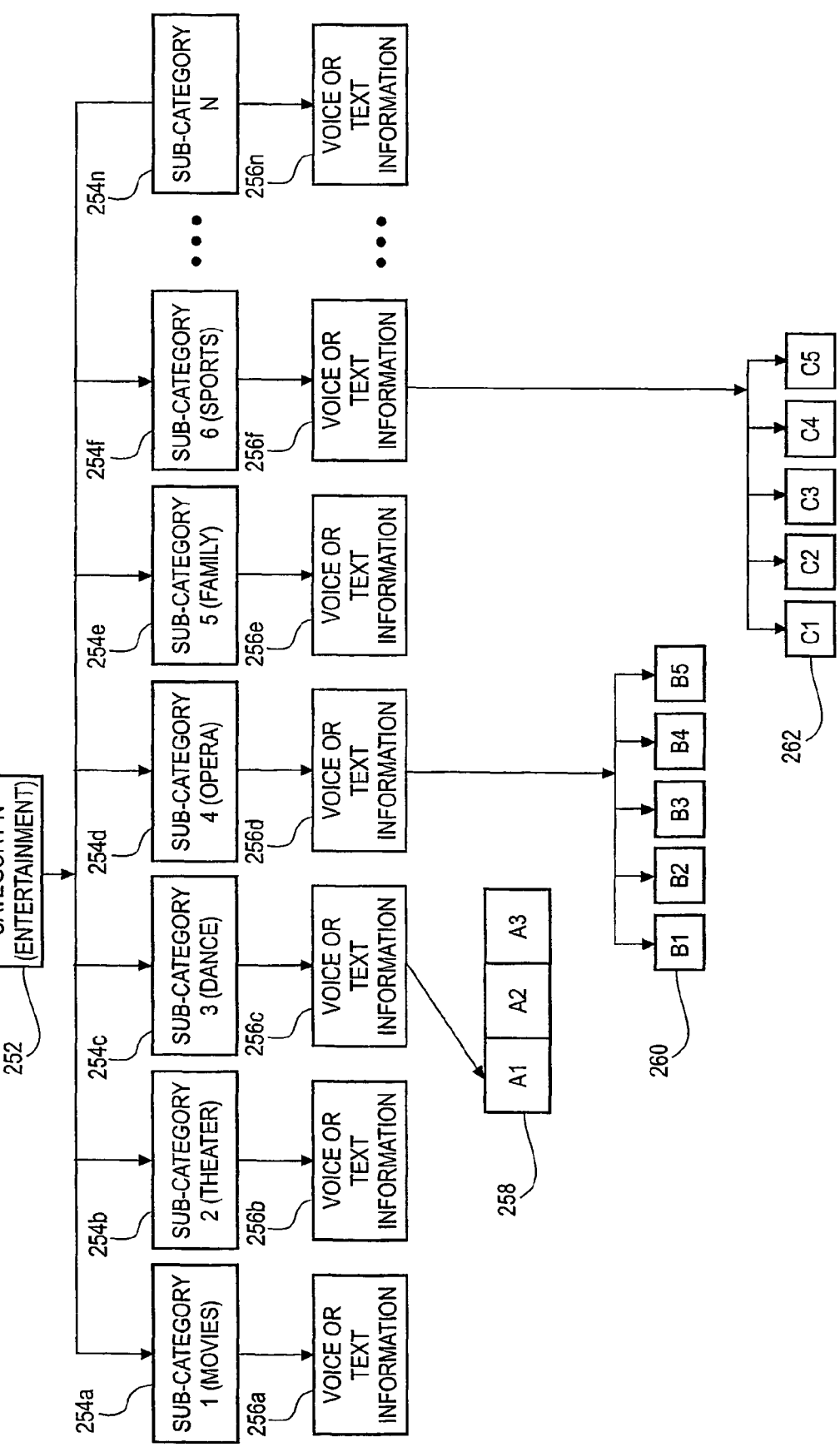

FIG. 3

| 1#1 | 1#2 | 1#3 | 1#4 | 1#5 | 1#6 | 1#7 | • • • | 1#n |
|---|---|---|---|---|---|---|---|---|
| 2#1 | 2#2 | 2#3 | 2#4 | 2#5 | 2#6 | 2#7 | • • • | 2#n |
| 3#1 | 3#2 | 3#3 | 3#4 | 3#5 | 3#6 | 3#7 | • • • | 3#n |
| 4#1 | 4#2 | 4#3 | 4#4 | 4#5 | 4#6 | 4#7 | • • • | 4#n |
| 5#1 | 5#2 | 5#3 | 5#4 | 5#5 | 5#6 | 5#7 | • • • | 5#n |
| 6#1 | 6#2 | 6#3 | 6#4 | 6#5 | 6#6 | 6#7 | • • • | 6#n |
| 7#1 | 7#2 | 7#3 | 7#4 | 7#5 | 7#6 | 7#7 | • • • | 7#n |
| 8#1 | 8#2 | 8#3 | 8#4 | 8#5 | 8#6 | 8#7 | • • • | 8#n |
| 9#1 | 9#2 | 9#3 | 9#4 | 9#5 | 9#6 | 9#7 | • • • | 9#n |
| 10#1 | 10#2 | 10#3 | 10#4 | 10#5 | 10#6 | 10#7 | • • • | 10#n |
| 11#1 | 11#2 | 11#3 | 11#4 | 11#5 | 11#6 | 11#7 | • • • | 11#n |
| • • • | • • • | • • • | • • • | • • • | • • • | • • • | • • • | • • • |
| N#1 | N#2 | N#3 | N#4 | N#5 | N#6 | N#7 | • • • | N#n |

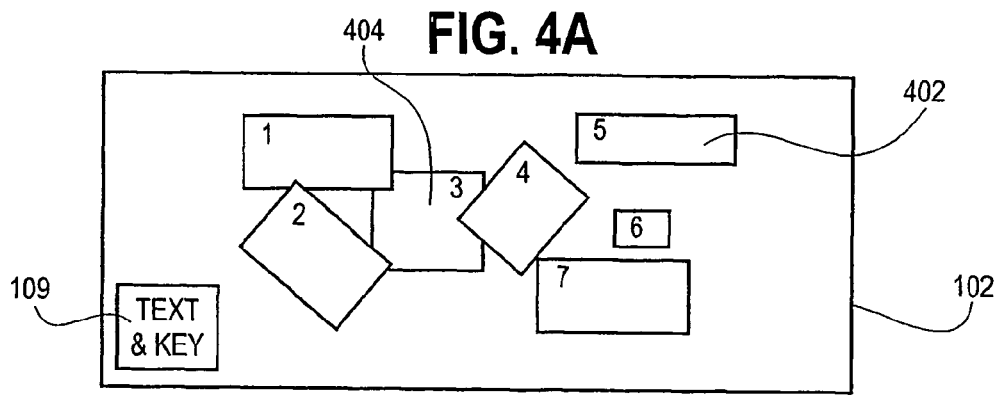
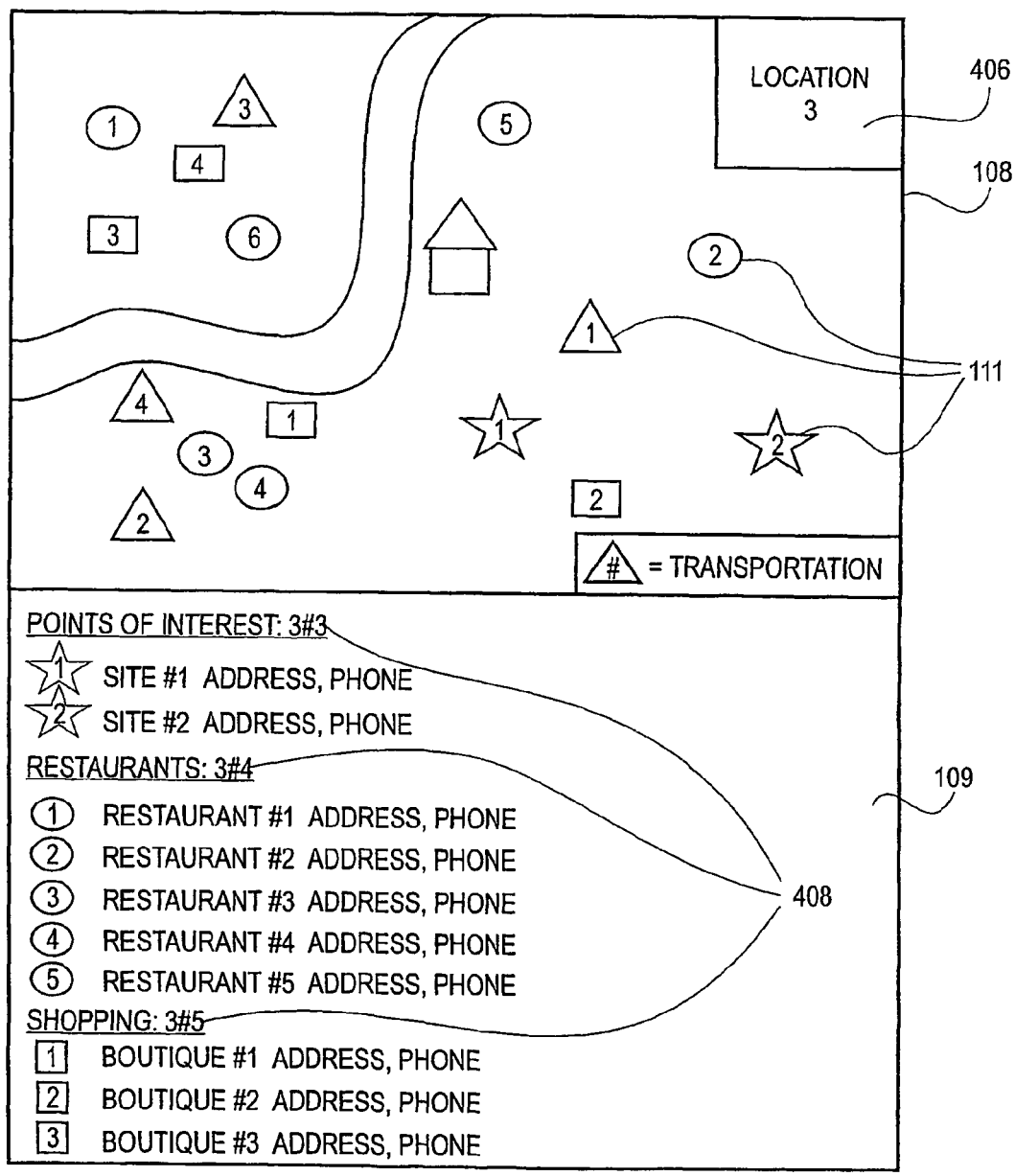

INTERACTIVE SYSTEM FOR PROCESSING AND RETRIEVING DATA RELATING TO A PARTICULAR DESTINATION VIA A COMMUNICATION DEVICE

This application claims priority to PCT/US01/15251 filed on May 11, 2001 which claims priority to provisional application 60/203,836 filed on May 12, 2000.

BACKGROUND OF THE INVENTION

1. Technical Field

This invention relates to an information processing system. In particular, the invention relates to an interactive system for processing and retrieving data relating to a particular destination via a communication device such as a telephone.

2. Background

With substantial growth in purchasing power over the past ten years and with increasingly accessible airline rates during this same period, it has become common for many households to engage in leisure travel, both domestic and international. Of particular note is the growth of the baby boomer travel market as well as the growing retirement population in good health and with the financial means to afford travel. Likewise, the continuing globalization of commerce has spawned an increase in business travel.

One problem commonly encountered by travelers is the loss of autonomy in a travel destination, whether it be foreign or not. Travelers often face an inability to efficiently make informed decisions concerning what sites to visit, where to eat, where to shop, the fastest way to get to a given destination, who to contact in case of an emergency, etc. Presently, there are various sources of information and assistance for travelers in the travel art, including travel agencies, hotel concierge services, travel books, personal/group guides, and internet travel websites. However each of these travel aides has one or more disadvantages associated with it. Travel agents are unavailable for resolving "on the spot" needs as they arise. Travel books tend to be cumbersome, expensive and inefficient, especially when several volumes are required for a single trip. Hotel concierge services are only available at a traveler's hotel, and their availability is limited due to the large demand by other hotel guests. Personal guides are generally very expensive and group guides do not allow for travelers to make personalized and autonomous travel decisions. In addition, travelers often prefer not to travel with a third-party "stranger" for reasons of privacy and independence. Finally, internet travel websites require an internet connection. In addition, a great amount of searching is often required to find what a traveler is looking for, and such searching can be time consuming depending on the speed of the connection.

In addition to the foregoing problems, emergencies such as, for example, the loss or theft of a passport or credit card, a sudden health problem, or an unexpected need for a taxi, may arise while the traveler is touring, resulting in potentially grave consequences for the traveler. Current travel resources are not always conducive to dealing with such emergencies. Additionally, the problems associated with travel decisions and resources are intensified for travelers in foreign countries where an inability to speak the language in the destination country further reduces autonomy. Because travelers in foreign countries typically cannot easily converse with persons in the host country, it is desirable to have the assistance of a bi-lingual guide. However, for the reasons mentioned above, options presently available have many disadvantages.

In light of the foregoing, there exists a need in the travel art for a travel resource that allows travelers to quickly resolve "on the spot" needs, is not physically cumbersome, is available to the traveler at all times, and provides independent, customized, personal travel information at relatively low cost.

SUMMARY

The present invention is directed to, in part, an efficient system and method for providing destination-specific information in response to a user input, as well as facilitating contact with merchants and other third parties. More specifically, a method is disclosed for providing data relating to a geographic location in a particular destination in response to a user input. The method comprises providing a map including the geographic location, receiving an identifier combination comprising a location identifier and a need identifier, accessing the data relating to the geographic location in a remote database based on the identifier combination, and transmitting the data to a user via a communication device. The method may further include providing one or more feature modes to allow the user to execute a corresponding feature. Furthermore, the method may include providing a full size map and a plurality of focused maps, wherein each focused map uniquely corresponds to one of a plurality of geographic locations on the full size map.

In another embodiment of the invention, a method is disclosed for providing data relating to one or more categories of information specific to a particular destination in response to a user input comprising providing a map including the particular destination, receiving an identifier combination comprising a need identifier and a sub-need identifier, accessing the data relating to the particular destination in a remote database, based on the identifier combination, and transmitting the data relating to the particular destination to a user via a communication device.

BRIEF DESCRIPTION OF THE FIGURES

The invention can be better understood with reference to the following figures. The components in the figures are not necessarily to scale, emphasis instead being placed upon illustrating the principals of the invention. Moreover, in the figures, like reference numerals designate corresponding parts throughout the different views.

FIG. 1b illustrates a cellular telephone 118 that can be used as a communication device in the system of FIG. 1a.

FIGS. 2a and 2b illustrate two potential approaches to organizing the data relating to a particular destination in accordance with the invention.

FIG. 3 illustrates one potential database architecture.

FIGS. 4a and 4b illustrates a full size map (FIG. 4a) and a focused map (FIG. 4b), respectively, as shown in FIG. 1a.

Figure 1A:
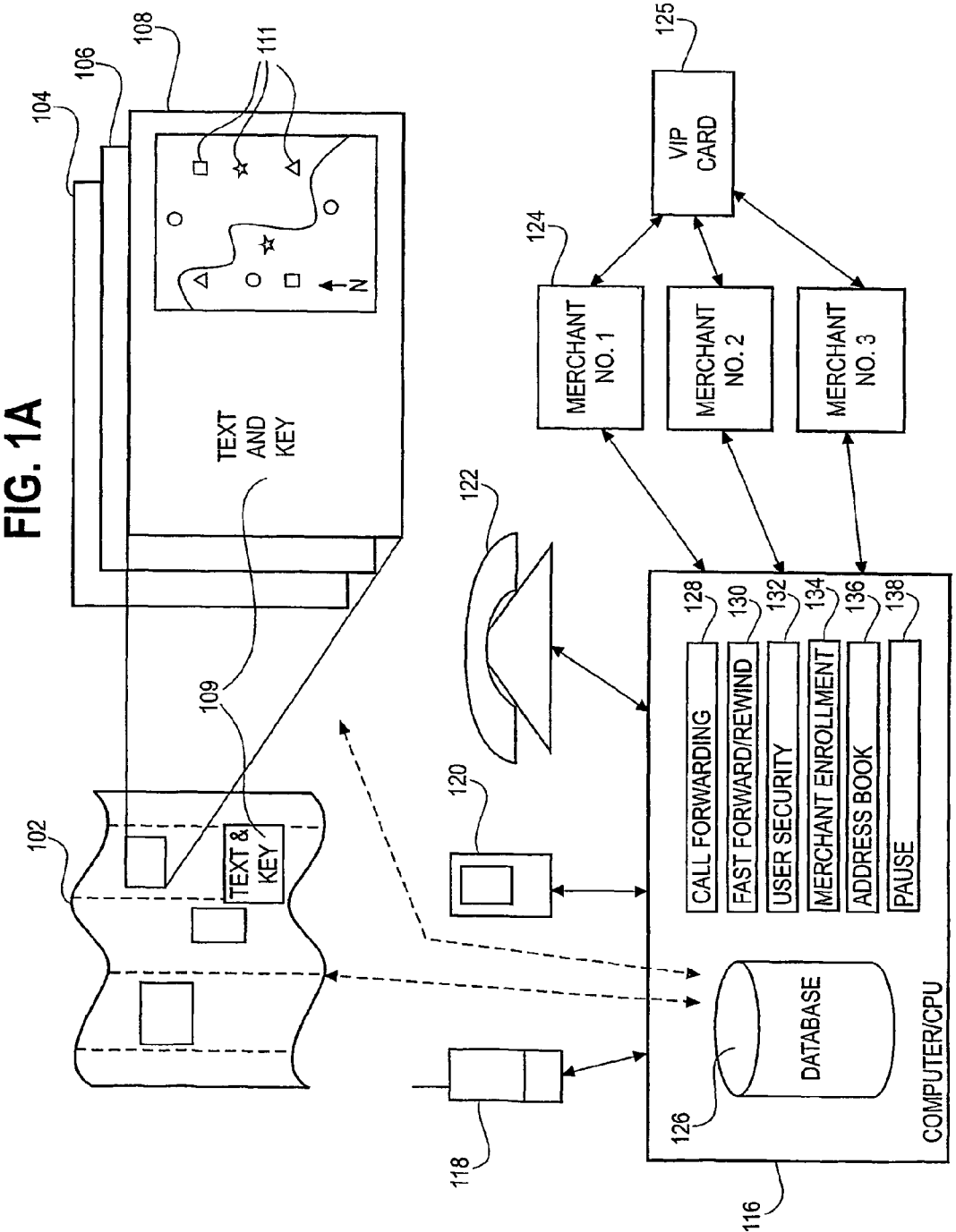
FIG. 1a illustrates a system for providing data relating to a particular destination in accordance with the invention.

Reference will now be made in detail to the description of the invention as illustrated in the drawings. While the invention will be described in connection with these drawings, there is no intent to limit it to the embodiments disclosed. On the contrary, the intent is to cover all alternatives, modifications, and equivalents included within the spirit and scope of the invention as defined by the appended claims.

DETAILED DESCRIPTION OF THE PREFERRED EMBODIMENTS

The invention can be broadly described as an interactive system for processing and retrieving data relating to a particular destination via a communication device.

FIG. 1a illustrates a system for providing data relating to a particular destination in accordance with the invention. A particular destination may be any site or locality including, but not limited to, a city, region, country, shopping mall, theme park or other similar attraction, building or campus. Furthermore, a particular destination includes one or more geographic locations within the particular destination. A geographic location may similarly be any site or locality within a particular destination.

The system may include a computer or processor 116 which may be accessed by users via a number of different types of communications devices such as, for example, cellular telephones 118, PDAs 120, or standard telephones 122 operating on a public switched telephone network (PSTN). The communications devices 118-122 may be owned by a user, temporarily provided to a user by a supplier as part of a service package, or available to a user via a hotel telephone or other public telephone. The processor 116 may also be accessed by a number of merchants 124 through various means (see, e.g., FIG. 7). As explained further herein, the system may also provide users with a system VIP card 125 which such users may present to various merchants 124 in order to receive special rewards.

The processor 116 includes a database 126 containing data files or data records relating to the particular destination identified on system maps 102-108. The system maps 102-108 are discussed in further detail below. In addition, the processor 116 may include various programs or subroutines such as, for example, a call forwarding subroutine 128, a fast forward/rewind subroutine 130, a user security subroutine 132, a merchant enrollment program 134, an address book subroutine 136, and a pause subroutine 138. Alternatively some or all of these programs or subroutines may be located locally in the communication devices 118-122, rather than remotely in the processor 116.

In a preferred embodiment, the processor 116 may be a conventional computer server which may be accessed by various communications devices 118, 120, 122, as well as via one or more personal computers. The processor may alternatively be a personal computer or other processor device. The subroutines and programs 128-138 located in the processor are generally simple and/or conventional computer programs which one of ordinary skill in the art of programming having the present specifications and drawings before them, would be able to implement. Many of these subroutines and programs are described further with respect to FIGS. 5 (security program/subroutine), 6 (pause program), 7 (merchant access), 8 (fast forward subroutine), 9 (return/rewind subroutine), and 10 (address book program).

The database 126 operably associated with the processor 116 is preferably a conventional database storing pre-generated data files. However, any means of storing the information may be utilized. An example database structure is described in association with FIG. 3. In accordance with a preferred embodiment of the invention, the database 126 is developed to provide data or information relating to a particular destination. The database may include a number of unique data files or data records (these terms are used interchangeably herein), each of which may be stored and accessed individually. In particular, the particular destination for which data is being provided may be defined by one or more geographic locations and/or categories of information.

Generally, a particular destination or a specific geographic location may be defined by various categories of information including, for example, historical information, opening times and prices for a point of interest (e.g., a building, park or other public attraction), nearby restaurants, nearby boutiques, nearby hotels, off the beaten path sites, entertainment, special events, time and money saving tips, transportation facilities and other destination-specific data. Both geographic locations and categories of information within a particular destination may be selected based on factors such as market study data, and may include the most frequently visited sites or locations in the particular destination or near the geographic locations.

As explained above, the system may include various system maps 102-108, wherein the system maps 102-108 may be associated with a plurality of data files contained in the database. Specifically, the system maps include at least one full size map 102 of a particular destination, and a plurality of focused maps 104-108, each of which may represent a respective portion 110-114 of the full size map 102. These respective portions of the full size map are referred to herein as the "geographic locations," and represent various sites or locations of interest in the particular destination represented by the full size map 102. One or more of the system maps 102-108 may include a key or legend with corresponding textual information 109 corresponding to information stored in the database 126.

Both the full size map 102 and the focused maps 104-108 may include various icons 111 identifying the position of various features such as, for example, restaurants, boutiques and/or stores, transportation, and other points of interest. As shown in FIG. 1a, these icons may be coded to provide quick graphical indications of the various features. For instance, as shown in FIG. 1a, the various icons may be, for example, "O" to represent restaurants, "☐" to represent boutiques and/or stores, "Δ" to represent transportation, and "☆" to represent other points of interest. In addition or alternative to the icons, the system maps 102-108 and/or the keys or legends 109 may include other indicia such as, for example, color-coded bands or markings, to indicate or identify various features and/or categories of information (e.g., shopping districts, theater districts, transportation stops, etc.). The full size map 102 and the focused maps 104-108 would preferably be paper-based maps, but may also be electronic maps displayed, for example, on a computer screen or on the screen of a personal digital assistant (PDA). The system maps 102-108 are discussed further with respect to FIG. 4.

Figure 1B:
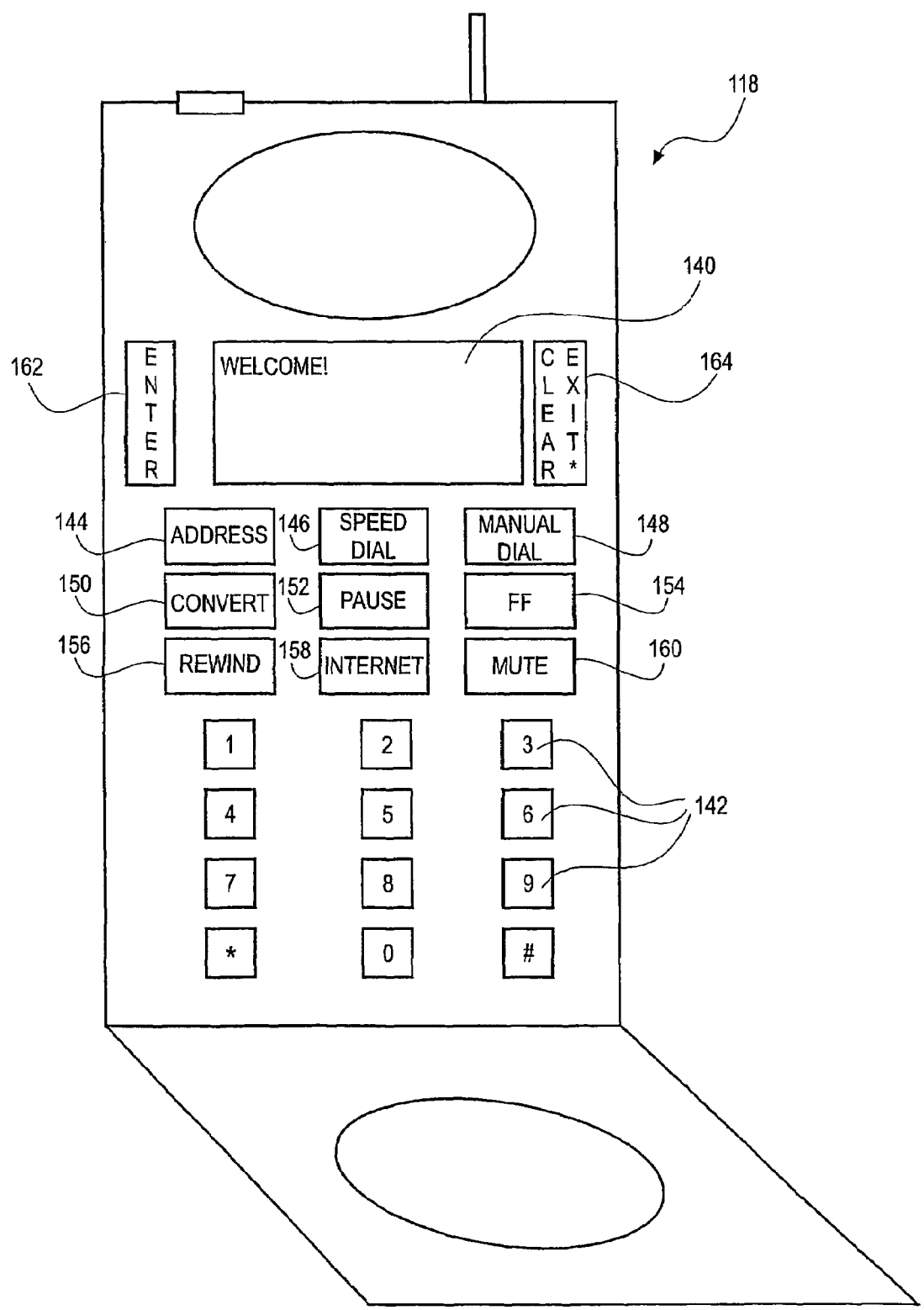

FIG. 1b illustrates a cellular telephone 118 that can be used as a communication device in the system of FIG. 1a. The cellular telephone 118 may include a display 140, number keys 142, feature mode keys 144-160, an "enter" key 162, and a "clear/exit" key 164. Of course, other types of cellular telephones are known, each potentially having different labels for its keys. Similarly, in an alternative embodiment, where the communication device may not include specific feature mode keys, the feature modes described herein may be accessed via pre-programmed mode keys, where various number keys 142 are pre-programmed to correspond to particular modes. For example, the number "3" may correspond to a pre-programmed fast forward identifier, and the number "1" may correspond to a pre-programmed return/rewind identifier. The various keys 142-164 of the cellular telephone (or other communication device) enable the system to receive various user inputs.

As explained below, various unique codes (e.g., "5#7") may be transmitted by the user via the communication device to obtain data files relating to a particular destination. The communication device may also include various feature mode keys 144-160. The feature mode keys may include, for example, an address book key 144, speed dial key 146, manual dial key 148, currency converter key 150, pause key 152, fast forward key 154, return/rewind key 156, internet access key 158, and mute key 160. If, for example, the manual dial key 148 is selected, the communication device 118 may be initialized to operate as a regular cellular telephone, whereby the user can make regular telephone calls in a well-known manner. Similarly, if the currency converter key 150 is selected, the communication device 118 may be initialized to operate as a currency converter, whereby the user can convert values of currency. It would be understood by one of ordinary skill in the art having the present specification and drawings before them, how to program the processor or the communication device to operate under any of these modes. Furthermore, these feature modes may be either accessed locally through the communication device 118 itself, or remotely through the processor 116.

Figure 2A:
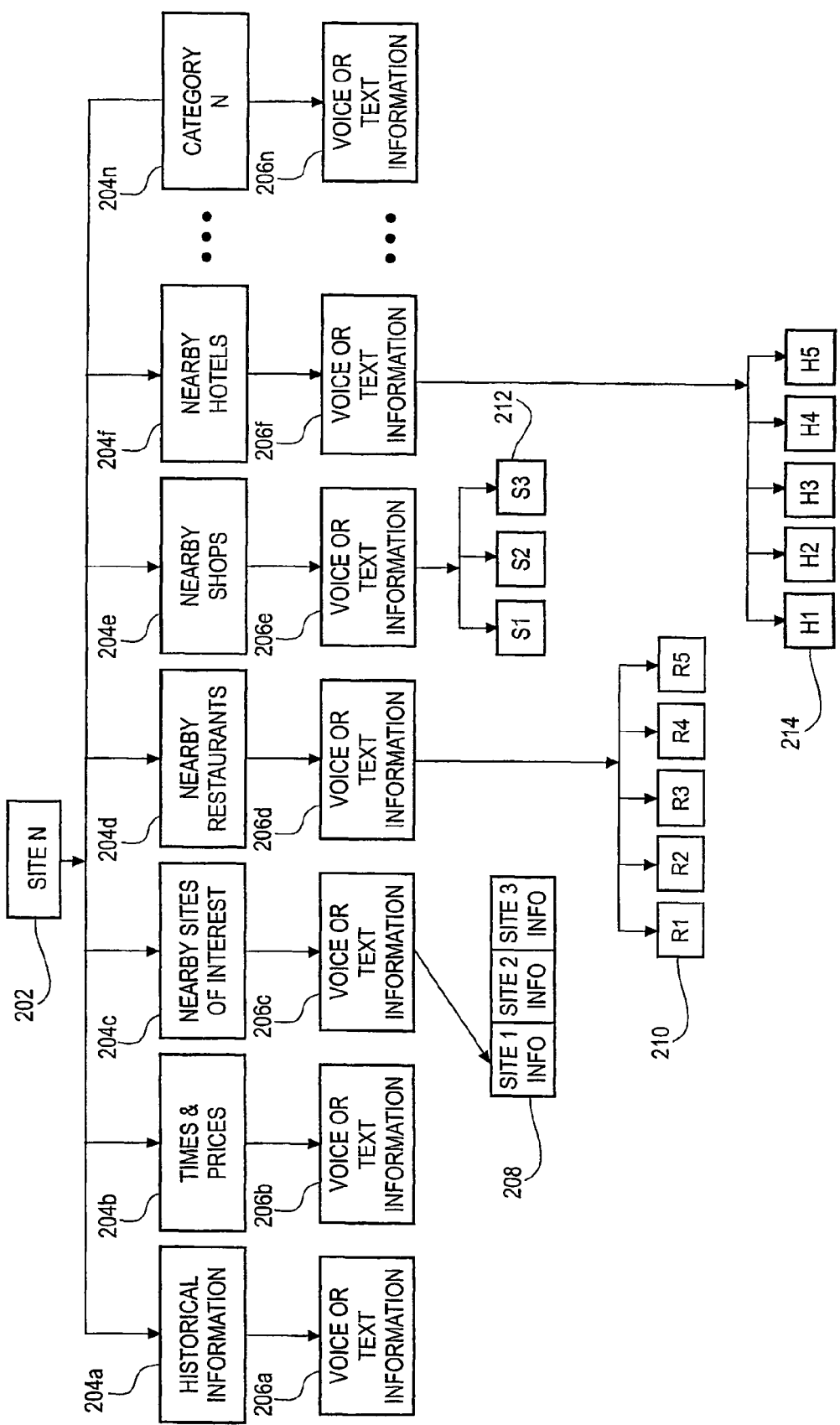

FIG. 2a illustrates one potential approach to organizing data relating to a geographic location in the particular destination, in accordance with the invention. For purposes of describing this FIG. 2a, each geographic location will be generically referred to as location or site "N". Each site N 202 may be defined by a number of different categories of information 204. Each of the different categories of information 204 corresponding to geographic location N 202 may be uniquely associated with a data file 206 in the database 126. In response to a user input, the data from a data file 206 may be provided to the user either aurally or textually (as explained further with respect to FIG. 6).

For example, as shown in FIG. 2a, site N may be a tourist location which may be defined by (1) historical information, (2) times and prices, (3) nearby sites of interest, (4) nearby restaurants, (5) nearby shopping, and (6) nearby hotels. As another example, the system may be used to help acclimate a potential transferee to a new city or town with various neighborhoods, suburbs or towns nearby his or her new work site. In such an example, the site, N, may be a particular neighborhood which may be defined by (1) demographic information; (2) real estate information; (3) nearby shopping; (4) nearby restaurants; (5) schools; (6) places of worship, etc. As would be understood by those of ordinary skill in the art having the present specification and drawings before them, this system and method can be applied to other various geographically based situations such as shopping malls (e.g., N=stores) or college campuses (e.g., N=residential halls, apartments, etc.).

FIG. 2b illustrates another potential approach to organizing data relating to a particular destination in accordance with the invention. For purposes of describing this FIG. 2b, each category of information defining the particular destination will be generically referred to as category "N". Each category N 252 may be defined by a number of different sub-categories of information 254. Each of the different sub-categories of information 254 corresponding to category N 252 may be uniquely associated with a data file 256 in the database 126. In response to a user input, the data from a data file 256 may be provided to the user either aurally or textually (as explained further with respect to FIG. 6).

For example, as shown in FIG. 2b, category N may correspond to Entertainment in a particular destination which may be defined by (1) sports facilities, (2) theater, (3) night clubs, (4) theme parks, (5) cinemas, and (6) health clubs. In another such example, category N may correspond to shopping districts which may be defined as (1) department stores; (2) street markets; (3) antique dealers; and (4) ethnic quarters. As another example, the system may be used to help acclimate a potential transferee to a new city or town with various neighborhoods, suburbs or towns nearby his or her new work site. In such an example, the category N may correspond to Doctors in a particular destination which may be defined by offices of (1) pediatricians, (2) dentists, (3) surgeons, (4) dermatologists, (5) ophthalmologists, and (6) general practitioners. As would be understood by those of ordinary skill in the art having the present specification and drawings before them, this system and method can be applied to other various categories of information based such as special events, emergency locations, or shopping.

In one embodiment of the invention, some of the data files as described with respect to FIGS. 2a and 2b may include particular items of information 208-214, 258-262. Such items of information 208-214, 258-262 may be interactive. For example, with respect to FIG. 2a, a category of historical information 204a may correspond to an associated aural or textual data file 206a listing or discussing historical information regarding a geographic location N 202. However, either before, during or after the data file 206a is provided to a user, the user may, in one approach of the invention, have an opportunity to request more detailed historical information relating to the particular geographic location N 202. Similarly, with respect to FIG. 2b, for a category N, 252, of Entertainment, a sub-category of sports facilities 254e may correspond to an associated aural or textual data file 256e listing or discussing various sports events, activities or teams in the particular destination. However, either before, during or after the data file 256e is provided to a user, the user may, in one approach of the invention, have an opportunity to request more detailed information 262 about a particular sports event, activity or team. Such items of information may be stored in a data sub-files 210, 260, and further defining either a site N 202 or a category N 252.

In one embodiment, the items of information 208-214, 258-262 (e.g., specific restaurants near a geographic location, or specific sports events in a particular destination) are collectively contained in one data file. In such an embodiment, each item of information may be accessed by the user by selecting a pre-programmed fast-forward or rewind identifier as described below with respect to FIGS. 1b, 8 and 9. Thus, if, while the user is receiving data from a data file, he or she desires to skip ahead to the third item (e.g., a description of the third restaurant in the line-up, or describing the third event in a list of sporting events), the user may, for example, select the pre-programmed fast forward key three times to get to the desired information. Alternatively, in one embodiment, each item of information 208-214, 258-262 as described herein may be contained in its own distinct data file.

FIG. 3 illustrates one potential database architecture. As shown in FIG. 3, the database 126 may be organized in a two-dimensional array where the rows 302 represent, for example, the geographic locations, and the columns 304 represent, for example, the categories of information which define the geographic locations (as described with respect to FIG. 2a). In addition or alternatively, the rows 302 may represent categories of information relating to the particular destination, and the columns 304 may represent sub-categories of information (as described with respect to FIG. 2b). In an embodiment as shown in FIG. 3, each location in the database may store a data record or point to a data record elsewhere in memory. The data files or records are identified by a unique combination of one or more identifiers ("identifier combination"). For example, the data file associated with the fifth row of the seventh column (306) may be uniquely identified by a combination of three identifiers: "5", "#", "7", where the first identifier in the combination may be a location identifier (i.e., an identifier which corresponds to a geographic location within a particular destination), the second identifier in the combination may be a link identifier (i.e., linking the first and third identifiers), and the third identifier may be a need identifier (i.e., an identifier which corresponds to a particular category of information). Alternatively, the first identifier may be a need identifier (corresponding to a category of information in the particular destination) and the third identifier may be a sub-need identifier (corresponding to a sub-category of information further defining the category of information).

In one embodiment, there may even be additional identifiers in the identifier combination. In such an embodiment, the identifier combination may be, for example, 5#7#3, where "3" may represents a particular item of category "7" defining location "5". Alternatively, 3 may represent a particular item of sub-category 7 of category 5. In this approach, the link identifier ("#") links multiple identifiers together.

Assuming, for example, the location identifiers represent the following sample geographic locations in and around Paris, France (Table 1A), and the need identifiers represent the following sample categories of information which define each geographic location (Table 1B), the data file identified by "5#7" represents a data record having information on entertainment near the Louvre.

TABLE 1A

| | |
|---|---|
| 1 | Eiffel Tower |
| 2 | Notre Dame |
| 3 | Arch of Triumph |
| 4 | Concorde |
| 5 | Louvre Museum |
| 6 | Orsay Museum |
| 7 | Opera |
| 8 | Montmartre |
| 9 | Versailles |

TABLE 1B

| | |
|---|---|
| 1 | Historical Information |
| 2 | Opening Times & Prices |
| 3 | Nearby sites of interest |
| 4 | Nearby restaurants |
| 5 | Nearby boutiques |
| 6 | Nearby hotels |
| 7 | Nearby entertainment |

In one embodiment, when a data file contains multiple selections (for example, the data file containing information on restaurants near the Eiffel Tower may include a list of multiple such restaurants), the database architecture may be a three-dimensional (rather than two dimensional) array. Thus, while the data file identified by "1#4" may provide (aurally or textually) a list of restaurants near the Eiffel Tower, the data file identified by "1#4#5" may describe a particular restaurant near the Eiffel Tower. As another example, the "Nearby boutiques" category of information may have subcategories such as (i) antiques and art galleries (ii) china, crystal & silver (iii) department stores (iv) designer fashions (v) flea markets (vi) gourmet foods (vii) jewelers (viii) open air food markets (ix) open air flower markets. Thus, information on jewelers near Notre Dame will be identified by the identifier combination, "2#5#7". While the geographic location may be changing, the further descriptions corresponding to need identifiers entered by a user via the communications devices may be kept uniform (e.g. the need identifier "1" may correspond to historic information, regardless of the particular geographic location of interest). This consistency of references to the various need categories may provide further convenience to the user.

FIGS. 4a and 4b illustrate a full size map 102 and a focused map 108, respectively, for use in a preferred approach to the system of FIG. 1a. Typically, a catalogue or index of identifier combinations, as well as most or all identifier combinations, may be provided in the system maps. The full size map 102 is generally a map of a particular city, and identifies various geographic locations 402 within the city. Alternatively the full size map 102 may be a map of a country or of a public location or attraction (e.g., an amusement park), which identifies various geographic locations 402 within the country (e.g., cities in the country) or public location (e.g., rides at an amusement park), respectively. The focused maps 108 are enlarged maps of each such geographic location 402. For example, the focused map 108 illustrated in FIG. 4 shows an enlarged view of Location No. 3 (404) on the full size map 102.

As explained above, both the focused map 108 and the full size map 102 may include a key and/or legend with written textual information 109. This legend may further explain the symbols or icons (e.g., ☆, ①, □) 111 for representing various categories of information (i.e., points of interest, restaurants, boutiques, respectively), and these symbols identify, on the focused map 108, where particular sites are located. In addition or alternatively, the system maps 102-108 and/or the keys or legends 109 may include other indicia such as, for example color-coded bands or markings, to indicate or identify various features and/or categories of information (e.g., shopping districts, theater districts, transportation stops, government buildings, etc.).

The headings 408 of the key/legend 109 on the full size map 102 and/or the focused maps 108 may indicate the appropriate code to enter into the communication device in order to obtain particular data files regarding various categories of information. For example, a user would enter "3 #4" to obtain information about restaurants in and around Location 3. The user might then enter "4" to obtain specific information from the data file or sub-file associated with the fourth restaurant on the list of restaurants in and around Location 3. Alternatively, while receiving a data file corresponding to the identifier "3#4, " the user may enter the fast forward key or identifier 4 times to receive the information relating to the fourth restaurant on the list of restaurants near Location 3. As noted above, in a system that maintains the consistency of coding for accessing various categories of information, it would be particularly easy to omit the legend on any or all particular focused map. In fact, various alternatives may become apparent in view of the present description.

Figure 5:
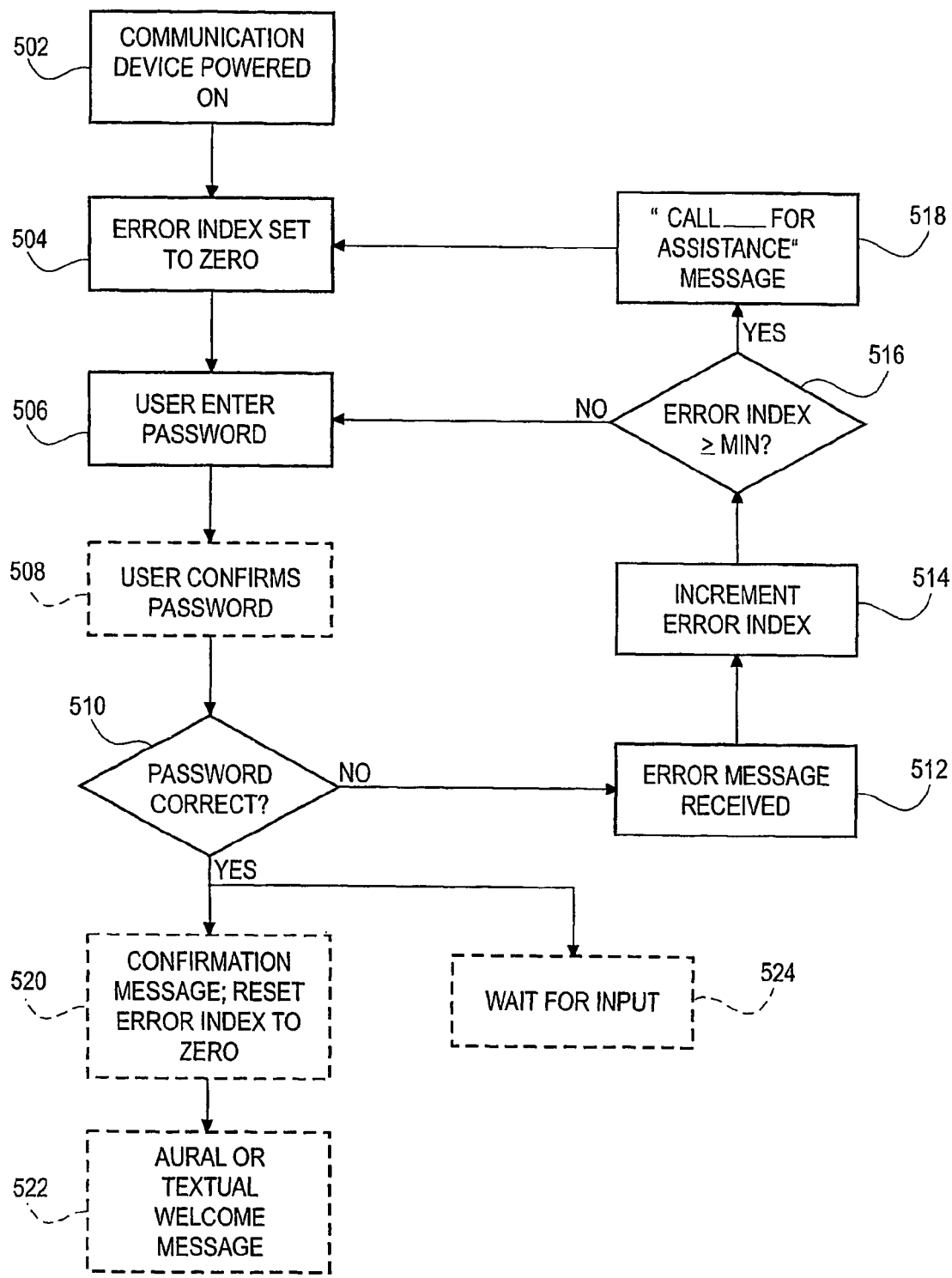
FIG. 5 illustrates one potential method of gaining access to the database 126 of the system of FIG. 1a via a communication device.

FIG. 5 illustrates one potential method of gaining access to the database 126 of the system of FIG. 1a via a communication device 118-122. As explained above, the communication device may be, for example, a cellular telephone, a PDA, or a standard telephone operating on a PSTN. In order to access the database, the processor may require a security check to verify that the user is entitled to such access. This process of gaining access to the database (steps 504-518, also referred to as the user security subroutine) may be accomplished locally in the communication device or remotely via a subroutine (132 in FIG. 1a) in the processor (116 in FIG. 1a).

First, the communication device is turned on, step 502. When the communication device is powered on, an error index associated with the security subroutine ("security error index") may be set to zero (0), step 504. The user may then be asked to enter a password, step 506, via a keypad or other input means. In one embodiment of the invention, for extra security, the user may be asked to confirm the password 508. The password may then be checked for correctness, 510, and if the password entered by the user is correct, an aural or textual confirmation message may be transmitted to the user via the communication device, and the security error index is reset to zero (0), 520. In one embodiment of the invention, an aural or textual welcome message may be transmitted to the user once the user has obtained access to the database, step 522. Alternatively, there may be no confirmation or welcome message, and if the password is correct, the processor waits for an input 524.

If the user fails to enter a correct password, an error message may be provided by the processor 116 (either aurally or textually), step 512, and the security error index may be incremented, step 514. Once incremented, the security error index indicates the total number of times an erroneous password has been entered. In a preferred embodiment, there is a maximum number of times such a password error is allowed ("MAX"). If this maximum, MAX, has been reached (step 516), an "assistance" message may be transmitted to the user, step 518, indicating, for example, who the user should call for assistance. Alternatively, the processor may automatically forward the user to a help-desk operator via an automatic call forwarding subroutine 128. If the maximum number of attempts, MAX, has not yet been reached, the user may be asked to re-enter a password 506.

Figure 6A:
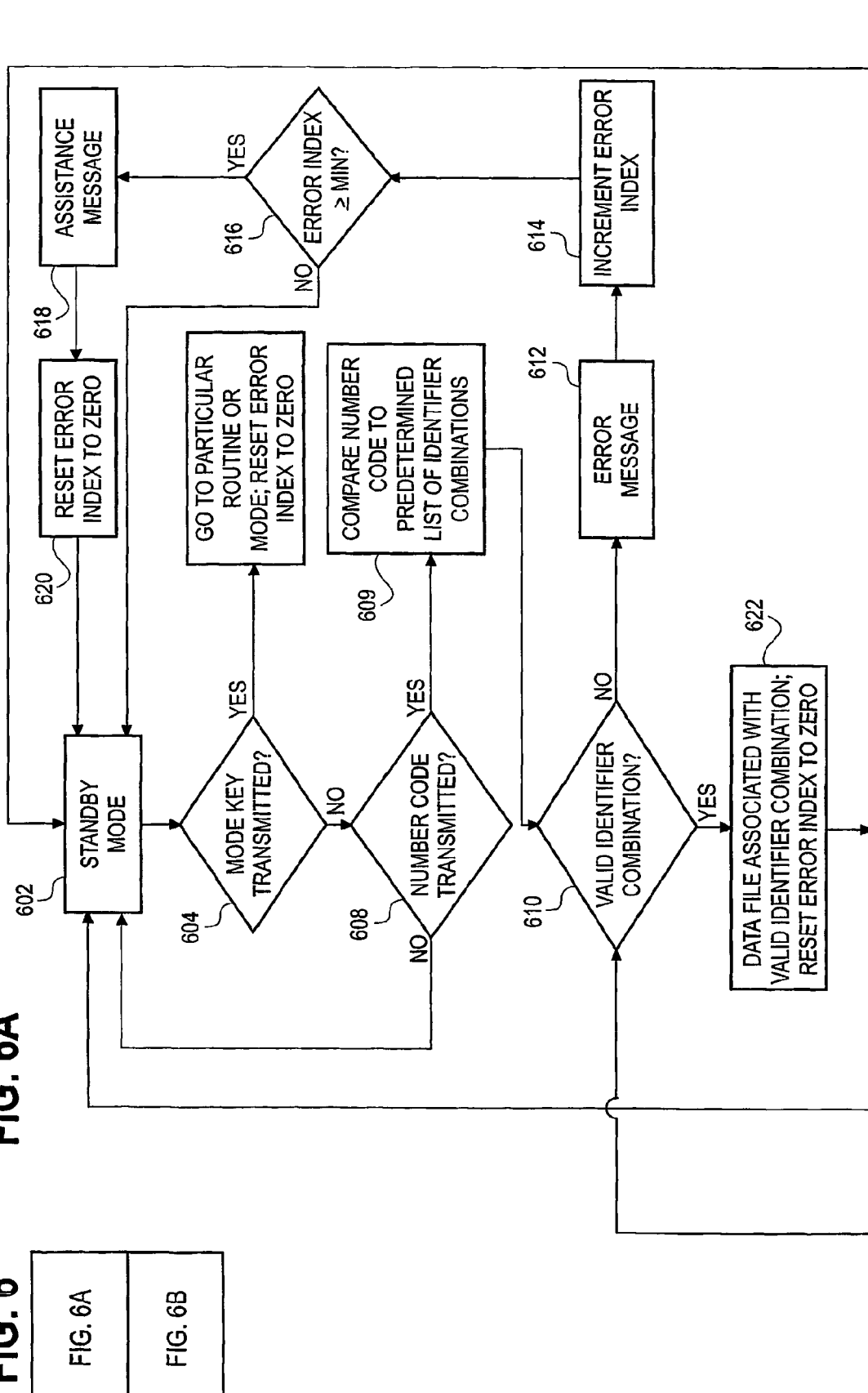
FIG. 6 illustrates one potential method of providing data relating to a particular destination in response to a user input, in accordance with the invention.
Figure 6:
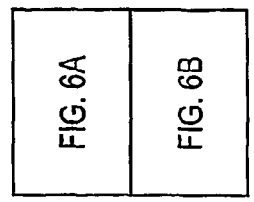
Figure 6B:
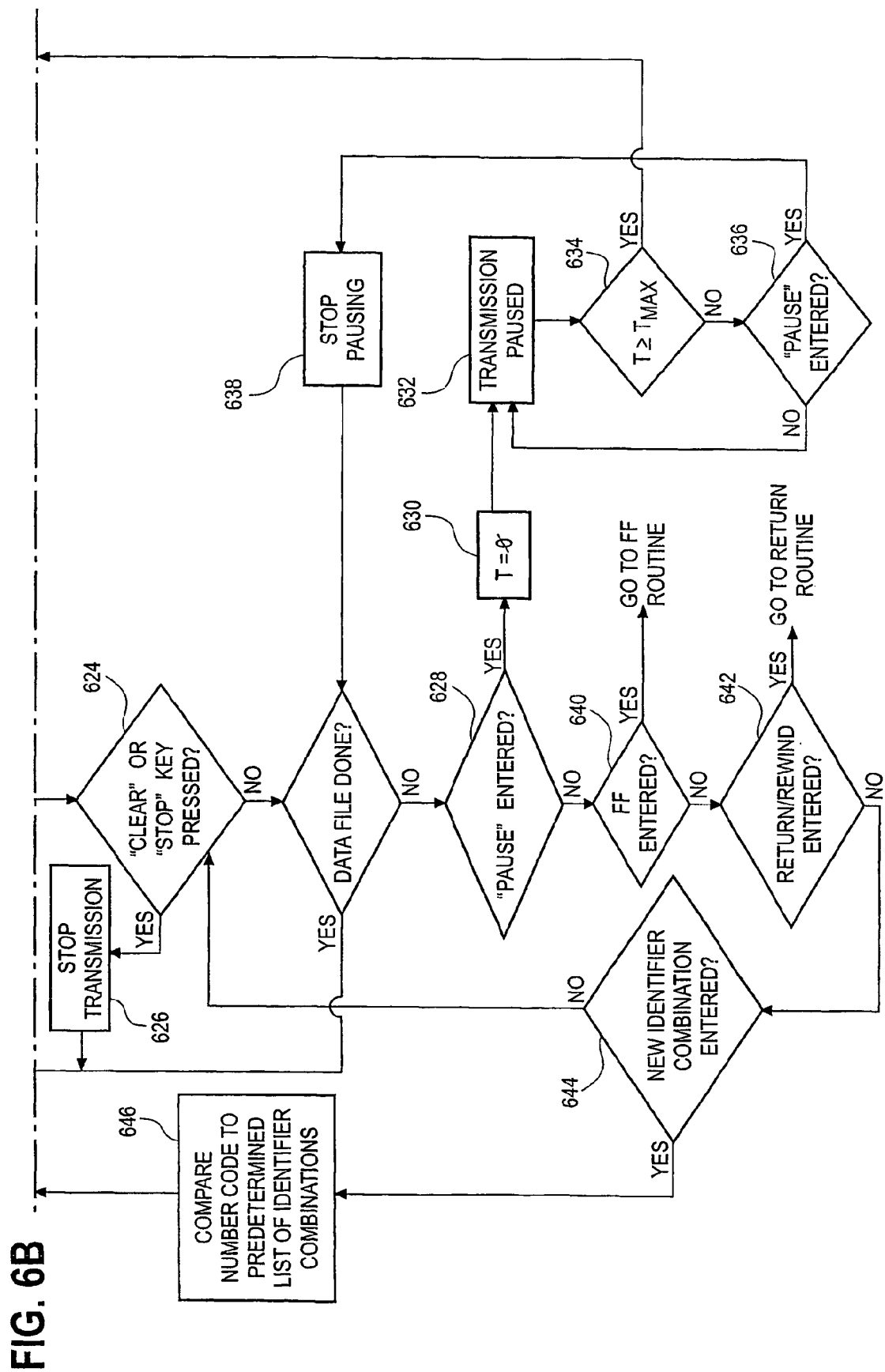

FIG. 6 illustrates one potential method of obtaining data relating to a particular destination in response to a user input. Upon gaining access to the database, the processor 116 may be put in a standby mode 602. Standby mode may be any mode in which the system is standing by waiting for an instruction or request. In a preferred embodiment, the standby mode occurs without utilizing airtime or database access time. While in standby mode the processor continues to check whether a feature mode key or a number code/sequence on the communication device has been transmitted 604, 608. If a mode key has been transmitted 604, the communication device goes into that particular mode, and the error index associated with the identifier combination ("identifier error index") is reset to zero (0), step 605. If neither a feature mode key nor a number code/sequence is received from or transmitted by the user, the processor 116 remains in standby mode and continues to check whether a user input has been transmitted, 604, 608.

If a number code or sequence has been transmitted by the user 608, the processor may compare that number code or sequence to a list of predetermined identifier combinations 609 to determined if the user has transmitted a valid identifier combination 610. If there is no match between the sequence transmitted by the user and any of the predetermined identifier combinations (thus indicating that the received sequence was not a valid identifier combination), step 610, an error message may be transmitted to the user 612, and the identifier error index may be incremented 614. If the identifier error index is greater than or equal to a predetermined maximum value (MAX) 616, an "assistance" message may be transmitted to the user, step 618, indicating, for example, who the user should call for assistance or transfers the user to a help-desk operator via the automatic call forwarding feature 128. The identifier error index is then reset to zero (0), step 620, and the processor would be returned to the standby mode, step 602. If the maximum number of attempts, MAX, has not yet been reached, the processor is returned to the standby mode, step 602.

If the processor determines that a valid identifier combination is received from the user, step 610, the data record associated with the entered identifier combination may be transmitted to the communication device 622. As explained above, in one embodiment of the invention, a valid identifier combination may include a location identifier followed by a link identifier (e.g., "#") followed by a need identifier. Further, the need identifier may be followed by another link identifier and then a sub-need identifier. Thus, for example, if based on Tables 1A and 1B a user enters a sequence "1#4#3" (where, in this example, "1" is the location identifier, "#" is a link identifier, "4" is a need identifier, and "3" is a sub-need identifier), and the processor determines that the identifier combination transmitted is a valid identifier combination 610, the data record uniquely corresponding to the entered identifier combination (i.e., the data record describing the third restaurant in a list of restaurants near the Eiffel Tower) is transmitted to the user via the communication device, and the identifier error index is reset to zero (0), step 622. In a preferred embodiment, where the communication device is a telephone, the data file may be transmitted by way of an aural message. However, the data record may be additionally or alternatively transmitted by way of a written message where the communication device includes a display.

While the data record is being transmitted to the user, the user may desire to stop, pause, fast forward, skip, or rewind the message while it is being transmitted. If the user stops the transmission of the data file while in progress by pressing "clear" or "stop", 624, the transmission stops, 626, and the processor is returned to the standby mode 602. If the user pauses transmission of the data record by pressing "pause", 628, a timer, T, is set to zero (0), 630, and the message is paused 632 for a predetermined period of time, $T_{MAX}$, 634-636. If, during the predetermined period of time the user presses the "pause" key again 636, the pause is cancelled 638, and transmission of the data record resumes from where it was left when the pause was initiated. However, if the system is left in the pause mode for a period of time greater than $T_{MAX}$, the processor returns to the standby mode.

If, during transmission of the data record, the user presses either the "fast forward" or "return/rewind" keys, steps 640 or 642, respectively, the fast forward or return/rewind subroutines are executed as described below with respect to FIGS. 8 and 9. If, during transmission of the data record the communication device transmits a new identifier combination 644, the steps of comparing the number code or sequence to a pre-determined list of identifier combinations 646, and checking whether the new sequence is a valid identifier combination 610 is repeated, as well as the subsequent steps previously described. Finally, if, during transmission of the data record, no keys are entered and the transmission of the data record is completed, 627, the processor again returns to the standby mode 602.

Figure 7:
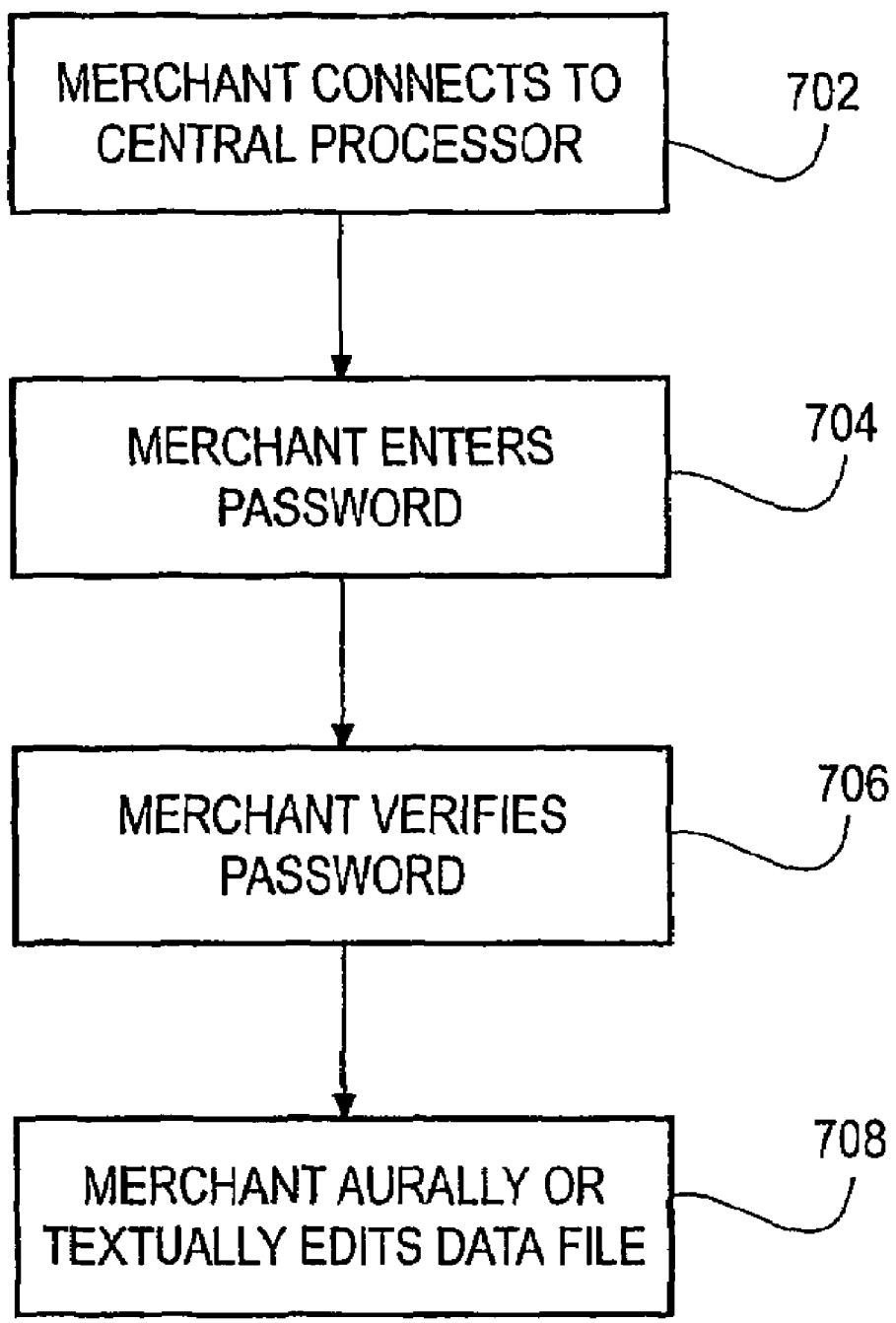
FIG. 7 illustrates a process of accessing the database by a merchant.

FIG. 7 illustrates a process of accessing the database by a merchant. In certain circumstances, a merchant (124 of FIG. 1a) may desire to access the database in order to verify, add or delete information relating to his business. First, the merchant either locally or remotely connects to the database 702. Then, the merchant gains access to the database by entering and verifying a password 704, 706. Finally, once the merchant has entered a valid password, he or she may perform various tasks on any data files to which that merchant has been given access 708. For example, the merchant may add information to or delete information from a particular data file.

Figure 8:
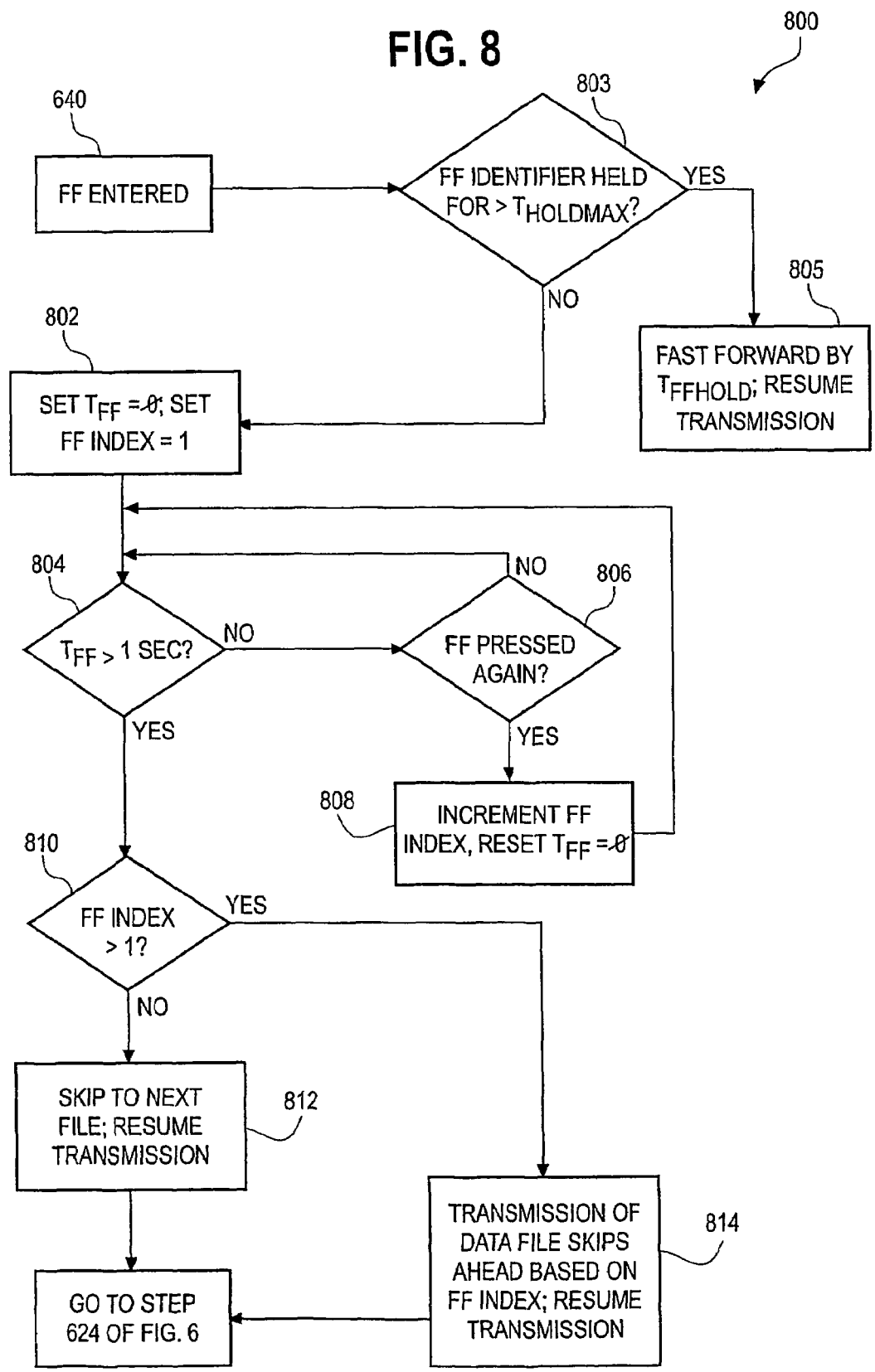
FIG. 8 illustrates a fast forward subroutine that may be provided in accordance with the invention.

FIG. 8 illustrates a fast forward subroutine that may be provided in accordance with the invention. If, during the transmission of a data record, a user transmits a fast forward instruction by pressing a fast forward key 154 as described with respect to FIG. 1b, or some other pre-programmed fast forward identifier (generally referred to as the fast-forward identifier) on the communication device, step 640, the processor executes a fast forward subroutine 800. In one embodiment, a fast forward ("FF") timer, $T_{FF}$, is first set to zero (0), and a FF index is set to one (1), step 802. If the processor detects that the FF identifier has been held for longer than a predetermined period of time, $T_{HoldMax}$, 803, then the current data record is advanced by an amount of time equal to $T_{FFHold}$ 805, where $T_{FFHold}$ is equal to the length of time the FF identifier is held for.

If the FF identifier is not held down for longer than $T_{HoldMax}$, then the fast forward subroutine operates in a "skip" mode as described below. If the FF identifier is pressed again, step 806, within a predetermined time period (e.g., $T_{FFmax}$=1 second), step 804, then the FF index is incremented, and the FF timer, $T_{FF}$, is reset to zero, step 808. If the FF identifier is again selected within $T_{FFmax}$, (steps 804-806), the FF index is again incremented and the FF timer, $T_{FF}$, is again reset to zero, 808. This process may continue until no additional FF instruction is transmitted within $T_{FFmax}$.

If the total number of times the FF identifier is transmitted is not greater than one (1), 810 (i.e., indicating that the fast forward identifier was only selected one time), then the processor may automatically transmit the next data record, 812, and the process again returns to step 624 (of FIG. 6) and continues on as described with respect to FIG. 6. However, if the FF index is greater than one (1), then the processor advances accordingly and transmits a sub-file based on the value of FF index. For example, if the FF index is three (3) (indicating the user pressed the FF identifier three times in relatively quick succession), then the processor advances by three (3) sub-files.

Figure 9:
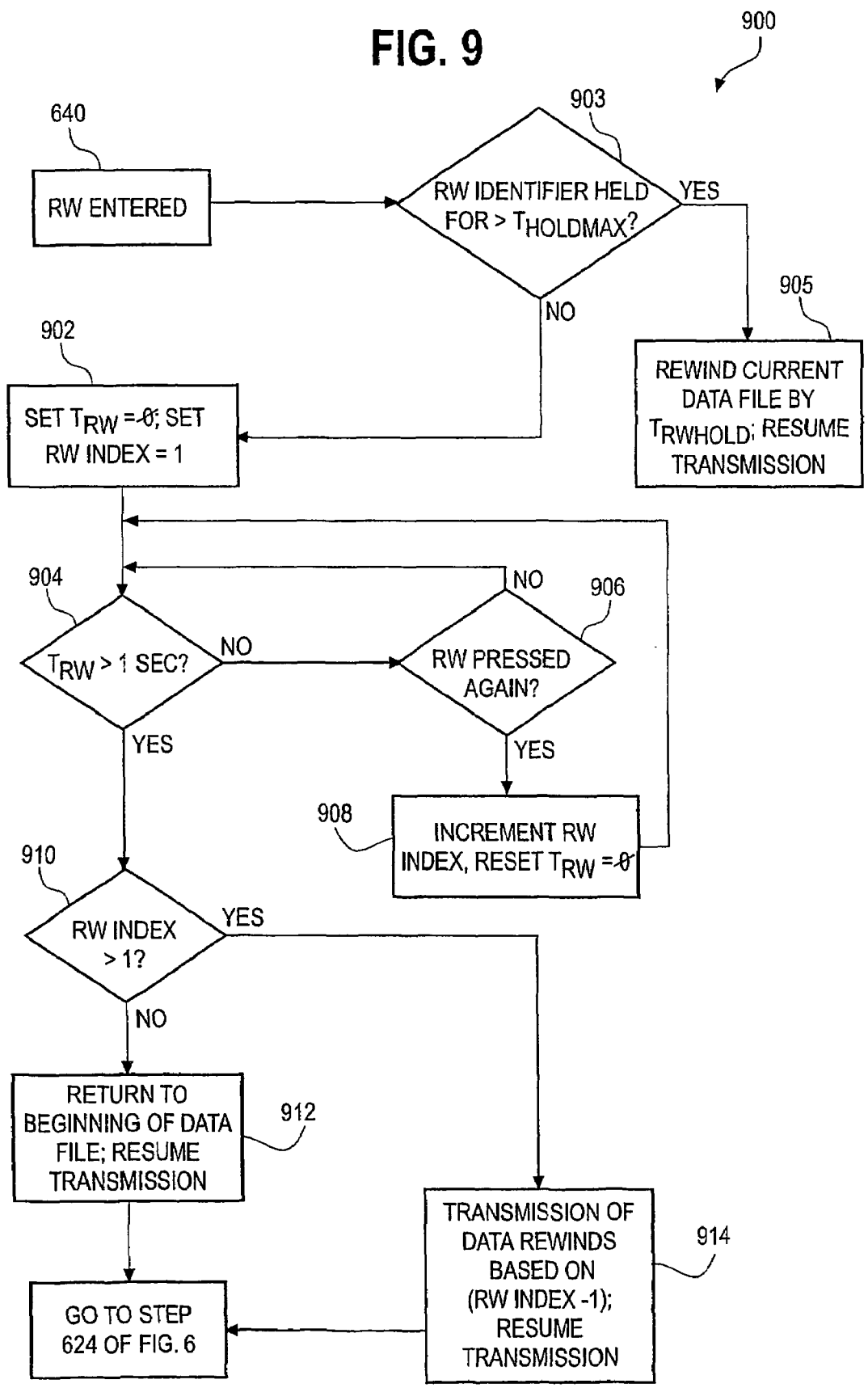
FIG. 9 illustrates a return/rewind subroutine that may be provided in accordance with the invention.

FIG. 9 illustrates a return/rewind subroutine that may be provided in accordance with the invention. If, during the transmission of a data record, a user transmits a rewind instruction by pressing a rewind key 156 as described with respect to FIG. 1b, or some other pre-programmed rewind identifier (generally referred to as the rewind identifier) on the communication device, step 640, the processor executes a rewind subroutine 900. In one embodiment, a rewind ("RW") timer, $T_{RW}$, is first set to zero (0), and a RW index is set to one (1), step 902. If the processor detects that the RW identifier has been held for longer than a predetermined period of time, $T_{HoldMax}$, 905, then the current data record is rewound by an amount of time equal to $T_{RWHold}$ 905, where $T_{RWHold}$ is equal to the length of time the RW identifier is held for.

If the RW identifier is not held down for longer than $T_{HoldMax}$, then the rewind subroutine operates in a "skip" mode as described below. If the RW identifier is pressed again, step 906, within a predetermined time period (e.g., $T_{RWmax}$=1 second), step 904, then the RW index is incremented, and the RW timer, $T_{RW}$, is reset to zero, step 908. If the RW identifier is again selected within $T_{RWmax}$, (steps 904-906), the RW index is again incremented and the RW timer, $T_{RW}$, is again reset to zero, 908. This process may continue until no additional RW instruction is transmitted within $T_{RWmax}$.

If the total number of times the RW identifier is selected is not greater than one (1), 910 (i.e., indicating that the rewind identifier was only selected one time), then the processor may automatically return to the beginning of the data record currently being transmitted, 912, and the process again returns to step 624 (of FIG. 6) and continues on as described with respect to FIG. 6. However, if the RW index is greater than one (1), then the processor rewinds or returns accordingly and transmits a sub-file based on the value of (RW index—1). For example, if the RW index is three (3) (indicating the user pressed the RW identifier three times in relatively quick succession), then the processor rewinds by two (2) (i.e., 3-1) sub-files.

Figure 10:
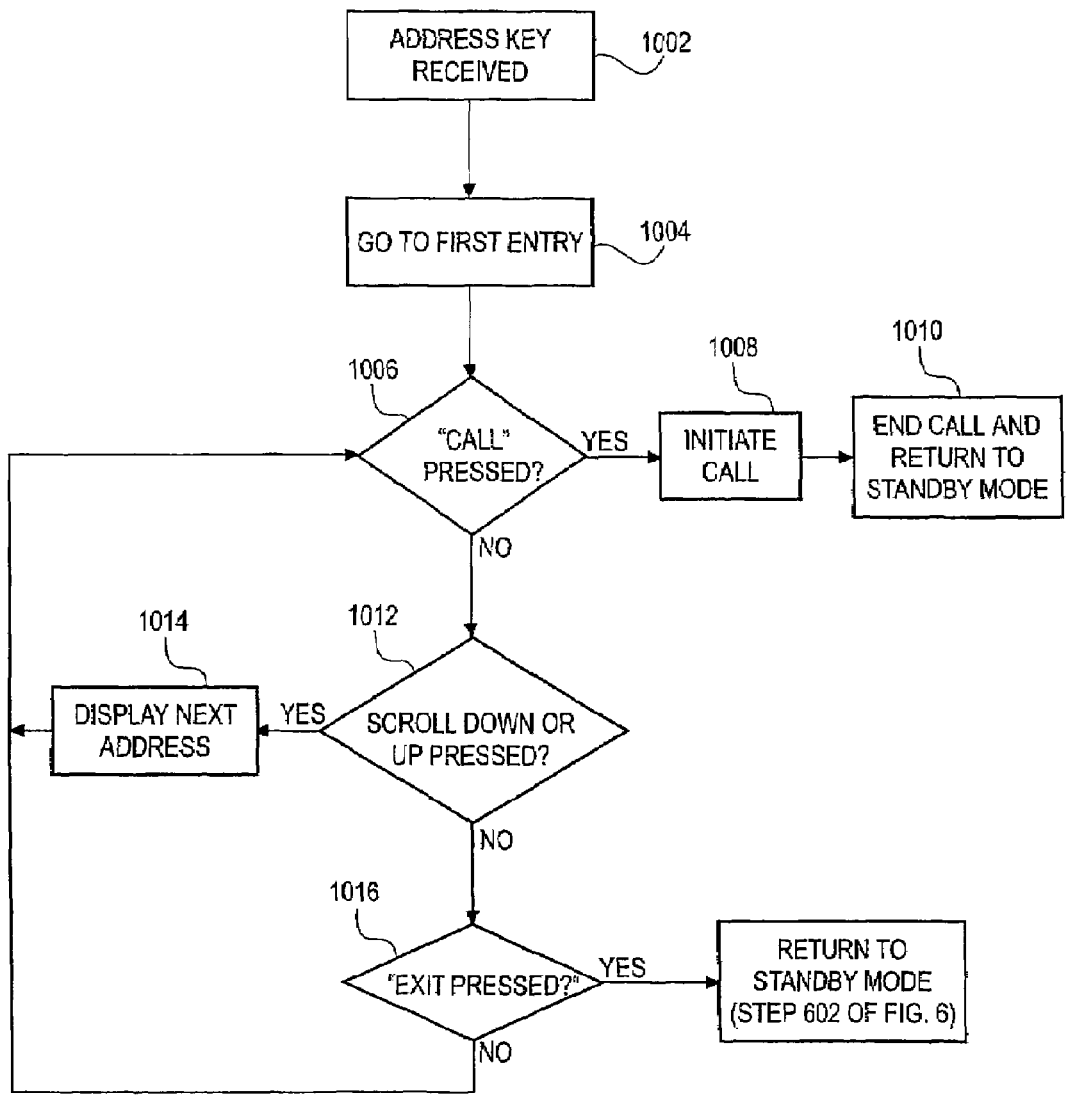
FIG. 10 illustrates a potential process for providing an address book mode which may be provided in connection with the present invention.

FIG. 10 illustrates a potential process for providing an address book mode which may be provided in connection with the present invention. The address book preferably includes a list of emergency, general information and other useful phone numbers. As explained with respect to FIG. 6, while in the standby mode, the processor 116 may check whether a feature mode instruction has been transmitted or received (step 604), and if a feature mode instruction has been transmitted or received, a subroutine corresponding to that feature mode may be executed, while the identifier error index is reset to zero (0), step 605. For the address book subroutine, once the address book mode instruction is received by the processor, 1002, the first entry in the address book is displayed textually (and/or recited aurally) 1004. If, in response to the displayed or recited address book entry, an "enter" instruction is received by the processor (referred to as a "call instruction"), 1006, the communication device may be controlled to initiate a call to the phone number stored by that address book entry, 1008. When the call is complete, the user may end the call (e.g., by pressing "exit"), and the processor is again returned to the standby mode 1010. If a scroll down or scroll up instruction is given by the user (instead of a "call" instruction), step 1012, then the next entry in the address book is displayed or recited, step 1014. This process of scrolling through the address book entries continues until either a call is initiated, step 1008, or the user exits the address book mode, 1016. If the user exits the address book mode, 1016, the communication device is again returned to the standby mode 602.

Although many routines and programs are described in detail herein with respect to FIGS. 5 (security program/subroutine), 6 (pause program), 7 (merchant access), 8 (fast forward subroutine), 9 (return/rewind subroutine), and 10 (address book program), these are only sample routines and/or programs, and it is understood by one of skill in the art that other types of routines may be implemented by the processor (116 of FIG. 1a) or by the communication device itself. For example, a simple call forwarding routine may be implemented whereby a user accesses a data file which identifies a merchant or some other entity having a telephone number, and the user wants to be automatically connected to that merchant or entity. The automatic connection may be achieved by the user entering an "automatic dialer identifier" (e.g., a predetermined number key), which instructs the processor to connect the user to such merchant or entity.

One embodiment of the invention incorporates a merchant enrollment program whereby merchants (e.g., restaurant and boutique owners) who are enrolled in the database may provide users with special treatment in the form of gifts, discounts, complimentary drinks or other forms of compensation. The merchant enrollment program typically includes a contracted agreement with the merchant, whereby the merchant agrees to provide pre-determined services to users of the database in exchange for a privileged position in the list of need or sub-need identifiers. For example, a merchant desiring to be listed as the first boutique in the list of boutiques near a particular geographic location may agree to provide certain pre-determined services to users of the database. One way in which a user may redeem rewards from a particular merchant is by presenting a system VIP card 125 as shown in FIG. 1a to participating merchants in order to receive such compensation or rewards. It is noted that a unique need identifier may be available corresponding to compensation offered by merchants, whereas sub-need identifiers reference particular merchants. Table 2 illustrates an example:

TABLE 2

| | |
|---|---|
| 1 = Emergency | 1: Emergency A |
| | 2: Emergency B |
| 2 = Entertainment | 1: Entertainment A |
| | 2: Entertainment B |
| | 3: Entertainment C |
| | 4: Entertainment D |
| 3 = Shopping | 1: Shopping A |
| | 2: Shopping B |
| | 3: Shopping C |
| 4 = Special Events | 1: Event A |
| | 2: Event B |
| | 3: Event C |
| * | * |
| * | * |
| * | * |
| 20 = Merchant Rewards | 1: Merchant reward A |
| | 2: Merchant reward B |
| | 3: Merchant reward C |

In the example of Table 2, a user might enter "20#3" to get information about rewards offered by Merchant C, where 20 is the need identifier and 3 is the sub-need identifer.

In one embodiment, the user enters an identifier combination corresponding to a particular category of information which includes information about merchants in or near a particular geographic location, and if the user subsequently purchases an item from a merchant enrolled in the database, the user receives some type of special treatment as described above. In one embodiment, the merchants may be selected for enrollment into the database based on their capacity to satisfy specific needs or desires of users relative to a particular travel destination. The enrolled merchant may pay a fee in exchange for the "airtime" given in one or more data records in the database. Such fee may be, for example, a flat fee or a percentage of revenues received from users referred to the particular merchant via the database.

The present system may also include standard or conventional report generation software that automatically generates airtime-billing reports whenever the user is provided with a portable communications device requiring use of airtime. The software may be configured to generate the reports on a daily, weekly or per-use basis. Based on the reports, users may be billed for airtime associated with their use of the communications device. Further, the reports may provide information concerning frequency and duration of local calls, long distance calls, or access to the database. Additionally, various other types of information may be provided in database-generated reports. For example, database reports may provide statistics on the number and duration of consultations for each identifier combination, thereby allowing system updates as a function of user needs and preferences. Additionally, the reports may provide demographic data about the users, including geographic regions of such users.

The present invention may be implemented in a variety of applications. For example, as suggested in the foregoing detailed description, the invention is particularly useful in the travel industry whereby tourists to a particular city are provided with system maps and a communication device, and such users may obtain data files in the database as described above in detail. Similarly, as described herein, the invention may be used by newcomers moving to a new city. In such a context, the need identifiers may focus on less tourist-type needs and more resident-type needs (e.g., housing, grocery stores, drug stores, job listings, beauty salons, schools, doctors' officers, fitness centers, religious services, etc.). As another example, the present invention may be used by business travelers. In such a context, the need identifiers may focus on needs such as, for example, business centers, airports, or other categories of information specific to the type of business of the business traveler. As another example, the present invention may be used to provide information to users in a shopping mall context wherein the system could provide opportune knowledge as a function of specific user needs such as sales items by product type, new product arrivals by user sex or age, season trends by product type, or special events (e.g., style shows, make-up artists, etc.).

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed:

1. A method for providing data relating to a geographic location in response to a user input comprising:
   providing a map including said geographic location;
   receiving a numeric identifier combination comprising a numeric location identifier corresponding to said geographic location and a numeric need identifier corresponding to a category of information associated with said geographic location;
   accessing said data relating to said geographic location in a remote database, based on said numeric identifier combination; and transmitting said data relating to said geographic location to a user via a communication device.

2. The method of claim 1 further comprising requiring a security check in order to provide access to said database.

3. The method of claim 2 further comprising transmitting a welcome message when access to said database is provided.

4. The method of claim 1 wherein receiving said need identifier includes receiving a need identifier corresponding to historical data.

5. The method of claim 1 wherein receiving said need identifier includes receiving a need identifier corresponding to shopping data.

6. The method of claim 1 wherein receiving said need identifier includes receiving a need identifier corresponding to at least one of restaurant data, entertainment data, nearby sites data, and special events data.

7. The method of claim 1 wherein receiving said location identifier includes receiving a location identifier corresponding to at least one of a city, region, country, shopping mall, theme park, building, street address, store and campus.

8. The method of claim 1 wherein transmitting said data includes transmitting said data aurally.

9. The method of claim 1 wherein transmitting includes transmitting said data textually.

10. The method of claim 1 further comprising providing a numeric feature mode to allow said user to execute a corresponding feature.

11. The method of claim 10 wherein providing said feature mode includes providing an address book.

12. The method of claim 11 further comprising providing an ability to automatically dial a phone number in said address book.

13. The method of claim 10 wherein providing said feature mode includes providing a currency converter.

14. The method of claim 10 wherein providing said feature mode includes providing a call forwarding mode.

15. The method of claim 1 further providing a full size map and a plurality of focused maps, wherein each focused map uniquely corresponds to one of a plurality of geographic locations on said full size map.

16. The method of claim 15 further comprising providing one or more indicia on at least one of said full size map and said plurality of focused maps, wherein each of said indicia corresponds to said numeric identifier combinations.

17. The method of claim 1 further comprising allowing said user to pause the transmission of said data.

18. The method of claim 1 further comprising allowing said user to fast forward the transmission of said data.

19. The method of claim 1 further comprising allowing said user to rewind the transmission of said data.

20. The method of claim 1 further comprising providing a merchant enrollment program wherein said enrollment corresponds to the receiving of said numeric identifier combination by a merchant.

21. The method of claim 20 further comprising providing an identification card via which said user redeems rewards from said merchant enrollment program.

22. The method of claim 21 wherein providing said merchant enrollment program comprises payment by a merchant in exchange for airtime.

23. A system for providing data relating to a geographic location in response to a user input comprising:
   a map including said geographic location;
   a database comprising said data relating to said geographic location;
   a plurality of numeric identifier combinations, each comprising a numeric location identifier corresponding to said geographic location and a numeric need identifier corresponding to a category of information associated with said geographic location; and a communication device for receiving one of said numeric identifier combinations from a user, and transmitting one of said data files to said user based on said received identifier combination.

24. The system of claim 23 wherein said need identifier corresponds to historical data.

25. The system of claim 23 wherein said need identifier corresponds to shopping data.

26. The system of claim 23 wherein said need identifier corresponds to at least one of restaurant data, entertainment data, nearby sites data, and special events data.

27. The system of claim 23 wherein said location identifier corresponds to at least one of a city, region, country, shopping mall, theme park, building, street address, store and campus.

28. The system of claim 23 wherein said data file is transmitted to said user aurally.

29. The system of claim 23 wherein said data file is transmitted to said user textually.

30. The system of claim 23 wherein said communication device comprises one or more numeric feature modes.

31. The system of claim 30 wherein said feature modes includes an address book mode.

32. The system of claim 31 further comprising an ability to automatically dial a phone number in said address book.

33. The system of claim 30 wherein said feature modes includes a currency converter mode.

34. The system of claim 30 wherein said feature modes includes a call forwarding mode.

35. The system of claim 23 further comprising a full size map and a plurality of focused maps, wherein each focused map uniquely corresponds to one of a plurality of geographic locations on said full size map.

36. The system of claim 35 further comprising one or more indicia on at least one of said full size map and said plurality of focused maps, wherein each of said indicia corresponds to said numeric identifier combinations.

37. The system of claim 23 wherein the transmission of said data is paused.

38. The system of claim 23 wherein the transmission of said data is fast-forwarded.

39. The system of claim 23 wherein the transmission of said data is rewound.

40. The system of claim 23 further comprising a merchant enrollment program wherein said enrollment corresponds to the receiving of a numeric identifier combination by a merchant.

41. The system of claim 40 further comprising an identification card via which said user redeems rewards from said merchant enrollment program.

42. The system of claim 40 wherein said merchant enrollment program comprises payment by said merchant in exchange for airtime.

43. A system for providing data relating to a geographic location in response to a user input comprising:
   means for providing a map including said geographic location;
   means for receiving a numeric identifier combination comprising a numeric location identifier corresponding to said geographic location and a numeric need identifier corresponding to a category of information associated with said geographic location;
   means for accessing said data relating to said geographic location in a remote database, based on said numeric identifier combination; and means for transmitting said data relating to said geographic location to a user via a communication device.

44. The system of claim 43 further comprising means for requiring a security check in order to provide access to said a database.

45. The system of claim 44 further comprising means for transmitting a welcome message when access to said database is provided.

46. The system of claim 43 wherein said need identifier corresponds to historical data.

47. The system of claim 43 wherein said need identifier corresponds to shopping data.

48. The system of claim 43 wherein said need identifier corresponds to at least one of restaurant data, entertainment data, nearby sites data, and special events data.

49. The system of claim 43 wherein said location identifier corresponds to a city, region, country, shopping mall, theme park, building, street address, store and campus.

50. The system of claim 43 wherein said data is transmitted aurally.

51. The system of claim 43 wherein said data is transmitted textually.

52. The system of claim 43 further comprising means for providing a numeric feature mode to allow said user to execute a corresponding feature.

53. The system of claim 52 wherein said feature mode is an address book.

54. The system of claim 53 further comprising means for automatically dialing a phone number in said address book.

55. The system of claim 52 wherein said feature mode is a currency converter.

56. The system of claim 52 wherein said feature mode is a call forwarding mode.

57. The system of claim 43 further comprising means for providing a full size map and a plurality of focused maps, wherein each focused map corresponds to one of a plurality of geographic locations on said full size map.

58. The system of claim 57 further comprising means for providing one or more indicia on at least one of said full size map and said plurality of focused maps, wherein each of said indicia corresponds to said numeric identifier combinations.

59. The system of claim 43 further comprising means for pausing the transmission of said data.

60. The system of claim 43 further comprising means for fast forwarding the transmission of said data.

61. The system of claim 43 further comprising means for rewinding the transmission of said data.

62. The system of claim 43 further comprising means for compensating said user.

63. The system of claim 43 further comprising means for providing a merchant enrollment program wherein said enrollment corresponds to the receiving of a numeric identifier combination by a merchant.

64. The system of claim 63 wherein said merchant enrollment program comprises payment by a merchant in exchange for airtime.

65. A method for providing data relating to a particular destination in response to a user input comprising:
providing a map including said particular destination;
receiving a numeric identifier combination comprising a numeric need identifier corresponding to one of a plurality of categories of information which define said particular destination, and a numeric sub-need identifier corresponding to a sub-category of information further defining said category of information;
accessing said data relating to said particular destination in a remote database, based on said numeric identifier combination; and transmitting said data relating to said particular destination to a user via a communication device.

66. The method of claim 65 further comprising requiring a security check in order to provide access to said database.

67. The method of claim 66 further comprising transmitting a welcome message when access to said database is provided.

68. The method of claim 65 wherein receiving said need identifier includes receiving a need identifier corresponding to time and money savers.

69. The method of claim 68 wherein receiving said sub-need identifier includes receiving a sub-need identifier corresponding to currency exchange.

70. The method of claim 65 wherein receiving said need identifier includes receiving a need identifier corresponding to entertainment information.

71. The method of claim 70 wherein receiving said sub-need identifier includes receiving a sub-need identifier corresponding to nightclubs.

72. The method of claim 70 wherein receiving said sub-need identifier includes receiving a sub-need identifier corresponding to theater.

73. The method of claim 70 wherein receiving said sub-need identifier includes receiving a sub-need identifier corresponding to sports facilities.

74. The method of claim 65 wherein receiving said need identifier includes receiving a need identifier corresponding to shopping data.

75. The method of claim 74 wherein receiving said sub-need identifier includes receiving a sub-need identifier corresponding to department stores.

76. The method of claim 74 wherein receiving said sub-need identifier includes receiving a sub-need identifier corresponding to street markets.

77. The method of claim 74 wherein receiving said sub-need identifier includes receiving a sub-need identifier corresponding to antique dealers.

78. The method of claim 65 wherein transmitting said data includes transmitting said data aurally.

79. The method of claim 65 wherein transmitting includes transmitting said data textually.

80. The method of claim 65 further comprising providing a numeric feature mode to allow said user to execute a corresponding feature.

81. The method of claim 80 wherein providing said feature mode includes providing an address book.

82. The method of claim 81 further comprising providing an ability to automatically dial a phone number in said address book.

83. The method of claim 80 wherein providing said feature mode includes providing a currency converter.

84. The method of claim 80 wherein providing said feature mode includes providing a call forwarding mode.

85. The method of claim 65 further comprising compensating said user.

86. The method of claim 85 wherein compensating said user comprises providing said user with an identification card for redeeming said compensation.

87. The method of claim 65 further comprising providing a merchant enrollment program wherein said enrollment corresponds to the receiving of a numeric identifier combination by a merchant.

88. The method of claim 87 wherein said merchant enrollment program comprises payment by said merchant in exchange for airtime.

89. The method of claim 65 further comprising providing one or more indicia on said full size map, wherein each of said indicia corresponds to said numeric identifier combinations.

* * * * *